United States Patent [19]

Sneed, Jr.

[11] 4,200,129
[45] Apr. 29, 1980

[54] WOOD TURNING TOOL

[76] Inventor: John Sneed, Jr., 21 Norwich, Pleasant Ridge, Mich. 48069

[21] Appl. No.: 891,681

[22] Filed: Mar. 30, 1978

[51] Int. Cl.² ............................................. B23B 27/00
[52] U.S. Cl. ............................................ 142/56; 142/7; 142/38
[58] Field of Search ............... 142/56, 7, 38, 48, 49, 142/55, 1

[56] References Cited

U.S. PATENT DOCUMENTS

| 839,752 | 12/1906 | Guenzler | 142/56 |
|---|---|---|---|
| 850,874 | 4/1907 | Tripp | 142/56 |
| 988,630 | 4/1911 | Diedrich | 142/49 |
| 1,991,051 | 2/1935 | Cook | 142/38 |
| 2,068,625 | 1/1937 | Burton | 142/38 |
| 3,277,933 | 10/1966 | Lalli | 142/56 |
| 3,304,969 | 2/1967 | MacDougall | 144/1 |
| 3,316,946 | 5/1967 | Ryan et al. | 142/1 |
| 3,768,527 | 10/1973 | Messick | 142/7 |

*Primary Examiner*—Leonidas Vlachos
*Attorney, Agent, or Firm*—Harness, Dickey & Pierce

[57] ABSTRACT

A hand mobile wood turning tool for the craftsman or hobbyist having a versatile and readily adjustable cutter which when used with a corresponding lathe, work table, and optional tracer guide will provide a great deal of cutting variation and ease of pattern duplication with an optimum smooth cut of the stock wooden workpiece without tearing the wood. The preferred embodiment gives the tool operator complete and safe control of the tool along with a self-wiping base to preclude hopping of the tool or other interference with normal tool operations. The tool rests on a work table and is freely movable thereon in all directions.

15 Claims, 5 Drawing Figures

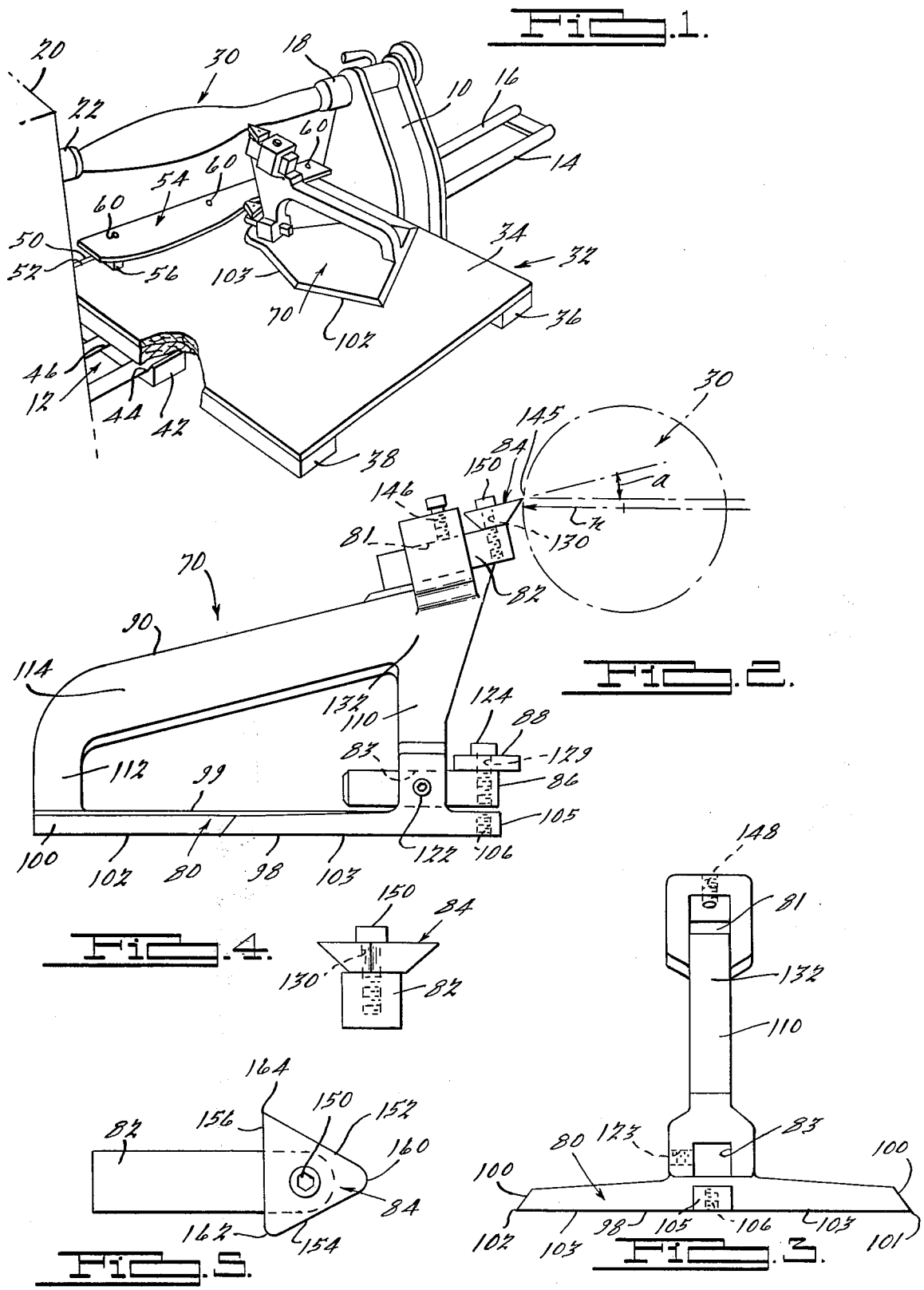

WOOD TURNING TOOL

BACKGROUND AND SUMMARY OF THE INVENTION

The present invention relates to improvements in wood turning tools and in particular to a completely hand mobile device that is capable of producing accurate pattern duplication and yet is simple in design, convenient to use, and inexpensive to manufacture.

Small lathes are a very versatile and relatively inexpensive tool for the hobbyist and craftsman. A wide variety of auxiliary wood turning tools have been developed for use with such lathes. However, these prior art devices are generally quite complex and frequently as expensive as the lathe itself. In addition, these devices generally require intricate mounting structures to which the tools must be rigidly secured to insure accurate tracing capabilities. Moreover, the position of the cutter in prior art tools is typically fixed relative to the centerline of the lathe which precludes adjustments for different types of stock.

Accordingly, one object of the instant invention is to provide an inexpensive hand mobile wood turning tool which cuts above the centerline of the stock workpiece and is angularly related to the horizontal so that the cutter attacks the workpiece at an acute angle to preclude tearing of the stock and generally produces an improved, smoother cut.

Another object of the invention described herein is to provide a hand mobile cutting tool which can perform many different cutting effects, such as alternating cutting edges without changing the cutter and skiving of the stock workpiece.

A further object of this invention is to provide a hand mobile tool which maintains its stability even as wood chips build up on the work table surface, thus retaining the alignment between the cutting and tracing means. The base of the present invention is firm, steady, and self-wiping while at the same time allowing for complete and easy hand mobility.

Yet another object of the instant invention is to provide an extremely safe wood turning tool. Certain prior art devices have a tendency to tip into the stock workpiece, drawing the user's hand into the machine, in the event the work stock is gouged by an excessive amount of force applied to the stock. The present invention precludes such motion due to its balance from the combination of its weight, the location of the handle as the force applicator, and a stabilizer projecting forward at the base of the device. In this manner, if gouged the stock will be knocked out of the lathe, but the operator will be protected.

Another object of this invention is to provide a wood turning tool having a great deal of flexibility and variation to accommodate different types of wood, different cuts, and different lathes while at the same time making any adjustments simple. The cutting means can be designed to perform any special cut. The operator can easily adjust the distance of the cutting edge above the horizontal radius of the workpiece to accommodate different hardness and types of wood. Also, the operator can readily change the cutting edge to change the depth of the cut with a minimum of time and effort. The work table can be readily attached and risen or lowered to accommodate virtually any lathe which would be purchased by a craftsman or hobbyist.

Another object of the invention herein is to provide a wood turning tool which can accurately duplicate a template. in particular, the present invention includes an optional tracing element that is vertically aligned with the cutter and adapted to guide the movement of the tool along the length of the workpiece by following the pattern of the template.

Another object of the invention herein described is to provide a cutter which has three different cutting edges, with said edges long enough to skive the wood stock properly and have enough thickness to permit simple hand sharpening of the cutter with a file or stone.

Other objects and advantages of the present invention will be apparent from a reading of the detailed description of the preferred embodiment which makes reference to the following set of drawings in which:

BRIEF DESCRIPTION OF THE DRAWINGS

FIG. 1 illustrates a lathe, a work table, a template guide means and a tool of the present invention;

FIG. 2 is a side view of a wood turning tool of the present invention;

FIG. 3 is a front view of the tool of FIG. 2 with the cutter and tracer and the corresponding workpiece holders removed;

FIG. 4 is a front view of the cutter of the present invention mounted on a workpiece holder removed from the tool of FIG. 2; and FIG. 5 is a top view of the cutter as shown in FIG. 4.

BRIEF DESCRIPTION OF THE PREFERRED EMBODIMENT

Referring to FIG. 1, the preferred embodiment of the wood turning tool is seen in the preferred working environment. A lathe as known in the prior art is shown having tailstock 10 slidably mounted on the bed 12 of the lathe. The lathe bed 12 typically comprises two substantially parallel tubular ways 14 and 16, which extend the entire length of the lathe. The tailstock 10 can be secured by suitable means at any point along the length of the ways 14 and 16 based on the length of the stock workpiece 30 utilized. The tailstock 10 supports the dead center spindle 18 which has suitable means for engaging the workpiece 30.

The lathe has a conventional headstock 20 which supports the live center spindle 22. The live center spindle 22 has suitable means for engaging the workpiece 30 to be driven. Any suitable means can be used to drive the live center spindle 22 and is not illustrated in the drawings. As shown, the workpiece 30 extends from the live center spindle 22 to the dead center spindle 18.

The work table 32 shown in FIG. 1 is a generally flat, rectangularly shaped wooden surface 34 having supports 36 and 38 attached along its undersurface perpendicular to the ways 14 and 16 of the lathe, which enable the work table 32 to be secured to the ways 14 and 16 of the lathe by attachment means described below. The table 32 can be made from any suitable material and the supports at the undersurface of the table may encompass a wide range of varying types of reinforcing members which can readily be utilized as a part of the attachment means.

The preferred attachment means is seen in the cutaway portion of FIG. 1. Retaining block 42 has notches 44 and 46. The notches 44 and 46 are spaced so that they align longitudinally with the parallel tubular ways 14 and 16, respectively. Bolt fastener means, not shown in the drawing, secure the retaining block 42 to work table support 36 to attach the work table 32 to the ways 14 and 16. The opposite end of work table 32 is secured with identical parts in exactly the same manner.

Furthermore, the work table 32 is aligned so that the work surface 34 extends outwardly substantially from one side of the lathe. The alignment means also aligns the work table supports 36 and 38 for ready connection with the bolt fastener means. In this embodiment, a flat extension 50 is attached to the edge 52 and directed perpendicularly downward from the work table 32. When the work table 32 is seated on the ways 14 and 16 of the lathe, the retaining blocks 42 are set in place one at a time. The table 32 can be slid across the ways 14 and 16 until the extension 50 completely abuts the retaining block 42. At that point, the block is also aligned for attachment of the bolt fastener means. The bolts are secured, the procedure is repeated at the other end of the work table, and the work table 32 is secured to the ways 14 and 16. The table 32 can extend from either side of the lathe.

Various guide templates 54 can be used with the invention or means can be provided as known in the art to duplicate a model workpiece directly. The guide templates 54 are preferably mounted on the work table 32. Various support means for the templates can be used. The preferred embodiment shows three support columns, one of which is shown at 56, to which the guide template is fastened by bolts 60.

The wood turning tool 70 is shown in FIGS. 1 and 2. The preferred embodiment is a one-piece casting of the base 80 and handle 90, with broached holes 81 and 83, shown in FIG. 3, to insert the cutter tool holder 82 and cutter 84, in hole 81, and the tracer tool holder 86 and the tracer 88, in hole 83. The handle 90 and the base 80 could be separate pieces. Several other variations could arise as equivalent constructions which may break up the tool 70 into an assembly of several parts.

As shown in FIG. 3, the base 80 has a generally flat lower surface 98 and an inward chamfer 100 on its upper surface 99 at its side edges 101 and 102 and a substantial portion of its forward edge 103. These chamfered edges, along with the weight of the base 80 and the force application due to the integral handle 90, gives the base 80 a wiping action as it is moved along the work surface 34 to keep wood chips from impeding the free movement of the tool. In addition, the wiping action of the base 80 prevents the tool from "riding" on the chips thereby destroying the alignment of the tool with the template 54. The base 80 further includes a stabilizer 105 at the midpoint of the forward edge 103 as a safety feature. The stabilizer 105 protects the operator by preventing the tool 70 from tipping forward toward the workpiece 30 when the stock workpiece 30 is gouged or fractured.

The handle 90 comprises a forward support 110, a shorter rearward support 112, and a hand grasp 114 which extends therebetween and is connected to the forward support 110 and the rearward support 112 equidistant from the side edges 101 and 102 of the base 80. The hand grasp 114 is inclined from the rearward support 112 to the forward support 110 at an acute angle. In the preferred embodiment, this angle is approximately 11 degrees, although other acute angles may be used. The angular relation is important both as an effective means of controlling the force applied by the tool to the workpiece, and also to obtain the proper angular attack for the cutter as will be discussed below to obtain a cut without tearing or shredding the stock in the workpiece 30.

In the preferred embodiment, as shown in FIG. 3, a rectangular-shaped hole 83 is formed in forward support 110 slightly above the base 80 extending from the midpoint of the forward edge 103 rearwardly through the forward support 110. Referring to FIG. 2, the tracer tool holder 86 fits slidably into said hole 83 and is secured to retaining bolt 122 set into tapped hole 123. The tool holder 86 can be adjusted to any point along the longitudinal axis of the hole 83 where bolt 122 can engage the side of the tool holder 86. The tracer 88 is shown operably connected to said tool holder 86 by bolt 124. The tracer 88 is roughly an equilateral triangular block of metal or other suitable material. The shape of the tracer 88 from above is dependent upon the shape of the cutter 84 which is described below. Alternatively, the stabilizer 105 has a tapped hole 106 into which the tracer 88 could be secured by bolt 124. As best shown in FIG. 3, a similar rectangular-shaped hole 81 is also formed in the forward support 110 above the joint 132 where the hand grasp 114 connects with the forward support 110. In the preferred embodiment shown in FIG. 2, the central axis of the hole 81 is parallel to the central axis of the hand grasp 114. The cutting edge 145 of the cutter 84 is preferably adjusted to attack the workpiece 30, shown dotted in FIG. 2, slightly above the axis of the workpiece 30 and at an acute angle "a" relative to said axis. Again, angle "a" is approximately 11 degrees in this embodiment. Cutter tool holder 82 fits slidably into said hole 81 and is secured by retaining bolt 146 in tapped hole 148. Similar to tracer tool holder 86, cutter tool holder 82 can be adjusted to any point along the longitudinal axis of hole 81 where bolt 146 can engage the side of the tool holder 82.

Referring to FIGS. 2, 4 and 5, the cutter 84 can be seen in operable connection with said holder 82 by bolt 150 in side, top and front views. The cutter 84 itself is shaped as an inverted triangular frustum. The base and the top of the cutter 84 form parallel planes. The skiving edges 152, 154 and 156 roughly form an equilateral triangle. Two of the corners of the triangle are rounded transversely with different radii of curvature to form cutting edges 160 and 162. Cutting edge 164 is a point corner. The thickness of the cutter 84 is substantial enough to permit the cutter to be sharpened by hand with a file or stone without rounding the cutting edges. In the preferred embodiment this thickness is roughly 0.25 inch. The disassembly of the bolt 150 is all that is necessary in order to change cutting edges.

The cutter 84 in combination with the position of the integral handle and the complete mobility of the tool provide the device with its great flexibility. Since the cutter 84 has edges rather than a mere point application, skiving of the workpiece 30 may be accomplished simply by rotating the tool so that all or part of the edge of the cutter 84 contacts the stock. This permits the user to rapidly remove large quantities of wood when roughing in a pattern. Furthermore, the skiving will still be guided by the guide template 54 since the tracer 88 has the same form as the cutter 84. In addition, the mere abundance of cutting edges on the cutter 84 eliminates the need for frequent sharpening and provides the user with a wide variety of available cutting approaches. As previously noted, each corner of the cutter 84 presents a different radius so that a precise duplication of any pattern can be accurately made. Moreover, the position of the cutter can be readily altered to provide the best cut for the particular type of wood being used. Thus, it can be seen that the cutter 84 contemplated herein presents a versatile cutting instrument that provides a wide variety of cutting methods heretofore unavailable in a single cutting instrument.

For maximum benefit, the length of the cutting edges of the cutter 84 should equal the length of the edges of the tracer 88 times the cosine of the attack angle "a". This relationship would provide an exact vertical projection of the cutter 84 dimensions onto the tracer 88, and thus provide extremely accurate reproduction of the guide template 54. But the tool 70 has a great deal of usefulness and exactitude even with a substantial variation between the tracer 88 and cutter 84 dimensions due to the ease of adjusting the alignment as provided by the slidable tool holders 86 and 82, respectively.

While the above description constitutes the preferred embodiments of the invention, it will be appreciated that the invention is susceptible to modification, variation and change without departing from the proper scope or fair meaning of the accompanying claims.

I claim:

1. A hand-held tool for turning a workpiece in a lathe having associated therewith a platform positioned below said workpiece, comprising:
   a base member defining the front, rear, and sides of said tool;
   a handle located above said base member spaced approximately equidistant from the sides of the tool and extending substantially the length of said tool from the front to the rear thereof;
   a front support member projecting upwardly from said base at a point approximately equidistant from the sides of said tool fixedly secured to and supporting said handle; and
   cutting means including a cutting element secured to and removable from said front support member, whereby said cutting element will contact said workpiece when the tool is moved along said platform;
   said tool being characterized by the angle of said handle relative to said base being substantially equal to the angle at which said cutting means contacts said workpiece.

2. A tool as set forth in claim 1 wherein the side edges of said base member as chamfered.

3. A tool as set forth in claim 1 further including tracing means including a tracing element secured to said front support member at said base so that said tracing element is vertically aligned with said cutting element.

4. A hand-held tool for turning a workpiece in a lathe having associated therewith a platform positioned below said workpiece, comprising:
   a base member defining the front, rear, and sides of said tool;
   a handle located above said base member spaced approximately equidistantly from the sides of the tool and extending substantially the length of said tool from the front to the rear thereof;
   a front support member projecting upwardly from said base at a point approximately equidistant from the sides of said tool; and
   cutting means including a cutting element secured to said front support member so that said cutting element will contact said workpiece when the tool is moved along said platform, wherein said cutting element comprises an inverted triangular frustum having three different cutting edges comprising the three corners at the inverted base of said frustum.

5. A tool as set forth in claim 4 wherein said three cutting edges of said cutting element comprise a point cutting edge and two cutting edges which are rounded transversely along the inverted base of said cutter with a different radius of curvature for each cutting edge.

6. A tool as set forth in claim 5 wherein said cutting element has three skiving edges comprising the three sides at the inverted base of said frustum.

7. A tool as set forth in claim 6 wherein said frustum of said cutting element has an axial thickness of at least 0.25 inches.

8. A wood turning comprising:
   a base, having forward, rearward and side edges, and having a flat bottom surface;
   a handle integrally connected to said base, extending from the rearward edge forward atop said base, comprising forward and rearward supports and a hand grasp extending between and connected to said forward and rearward supports, the longitudinal axis of said hand grasp forming an acute angle relative to the plane of said base; and
   cutting means secured to the upper portion of said forward support so that said cutting means forms an acute angle relative to the plane of said base.

9. A tool as set forth in claim 8 which further comprises a tracer connected to the forward portion of said base in vertical alignment with said cutting means.

10. A tool as set forth in claim 9 wherein said base has inwardly tapered side edges.

11. A tool as set forth in claim 10 wherein said base has a forwardly extending stabilizer at the midpoint of the forward edge.

12. A tool as set forth in claim 8 wherein said cutting means comprises a cutter comprising an inverted triangular frustum having three different cutting edges comprising the three sides at the inverted base of said frustum, and fastener means for fastening said cutter to said forward support.

13. The combination of the tool of claim 8 and table means comprising a work table having a flat work surface and having attachment means for removable attachment to the ways of a lathe.

14. A combination as set forth in claim 13 wherein said table means further comprises alignment means at one edge of said work table to align said edge parallel to the ways of said lathe so that substantially all of said work surface extends from one side of said lathe.

15. The combination as set forth in claim 14 wherein said work table has a removable tracer guide fastened to said table to provide a pattern for said tracer directly beneath the center line of said lathe.

* * * * *